(12) United States Patent
Fujii et al.

(10) Patent No.: US 7,804,788 B2
(45) Date of Patent: Sep. 28, 2010

(54) RING TYPE NETWORK SYSTEM INCLUDING A FUNCTION OF SETTING UP A PATH

(75) Inventors: Yasuki Fujii, Kawasaki (JP); Keiji Miyazaki, Kawasaki (JP); Shinya Kano, Kawasaki (JP); Akira Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 919 days.

(21) Appl. No.: 11/487,391

(22) Filed: Jul. 17, 2006

(65) Prior Publication Data

US 2007/0217345 A1 Sep. 20, 2007

(30) Foreign Application Priority Data

Mar. 17, 2006 (JP) ............................. 2006-074589

(51) Int. Cl.
*H04L 12/28* (2006.01)
*H04L 12/56* (2006.01)

(52) U.S. Cl. ........................................ 370/254; 370/406

(58) Field of Classification Search ................ 370/216, 370/217, 221–225, 228, 396–399, 400–409
See application file for complete search history.

(56) References Cited

U.S. PATENT DOCUMENTS

| | | | | |
|---|---|---|---|---|
| 5,959,968 A | * | 9/1999 | Chin et al. | 370/216 |
| 6,163,543 A | * | 12/2000 | Chin et al. | 370/400 |
| 6,298,061 B1 | * | 10/2001 | Chin et al. | 370/400 |
| 6,529,511 B1 | * | 3/2003 | Du et al. | 370/397 |
| 6,848,062 B1 | * | 1/2005 | Desai et al. | 714/4 |
| 7,099,287 B1 | * | 8/2006 | Oz et al. | 370/258 |
| 2004/0019673 A1 | * | 1/2004 | Miyazaki et al. | 709/223 |
| 2004/0215761 A1 | * | 10/2004 | Fujii et al. | 709/223 |
| 2006/0209877 A1 | * | 9/2006 | Yamamoto | 370/452 |

FOREIGN PATENT DOCUMENTS

JP 6-237262 A 8/1994

\* cited by examiner

*Primary Examiner*—Ayaz R Sheikh
*Assistant Examiner*—Blanche Wong
(74) *Attorney, Agent, or Firm*—Staas & Halsey LLP

(57) ABSTRACT

A node for configuring a ring type network system in such a mode that a plurality of physical links belonging to difference rings exists between nodes opposite to each other, has a storage unit stored with link associated information representing an associated relationship between ports of physical links and a port of a virtual link virtually set up to at least one physical link, ring configuration information representing a paired relationship of the ports of the physical links configuring the different ring, port numbers of both ends of the physical link and port numbers of both ends of the virtual link, and a processing unit executing a process of transmitting, to other nodes, such information that one virtual link is associated with the plurality of physical links belonging to the different ring, and setting up, when receiving a signaling message for setting up a path, the path passing through the same ring on the basis of pass route information in the message and the storage information stored in the storage unit.

7 Claims, 6 Drawing Sheets

2 LINK ASSOCIATED INFORMATION TABLE (NODE N6)

FIG. 5

3 RING CONFIGURATION INFORMATION TABLE (NODE N6)

FIG. 6

4 PHYSICAL LINK INFORMATION TABLE (NODE N6)

| |
|---|
| #2, #1 |
| #3, #11 |
| #4, #6 |
| #5, #7 |

FIG. 7

5 VIRTUAL LINK INFORMATION TABLE (NODE N6)

| |
|---|
| #b, #a |
| #h, #g |
| #c, #d |

FIG. 8

RING TYPE NETWORK SYSTEM INCLUDING A FUNCTION OF SETTING UP A PATH

BACKGROUND OF THE INVENTION

The present invention relates generally to a ring type network system in such a mode that a plurality of physical links belonging to difference rings exists between two nodes opposite to each other, and more particularly to a ring type network system having a function of setting up a path (active path) capable of restraining use of standby resources for ring protection.

In a SONET (Synchronous Optical Network)/SDH (Synchronous Digital Hierarchy) network as a ring type network system, there is a method by which topology information is organized by advertising (broadcasting) virtual link information in a way that utilizes a routing protocol OSPF-TE (Open Shortest Path First-Traffic Engineering) (defined in RFC3630), and a path is set up based on a result of calculating a route of the path in a way that utilizes a signaling protocol RSVP-TE (Resource Reservation Protocol-Traffic Engineering) (defined in RFC3209, RFC3473) etc.

In the prior art, however, the ring information (ring configuration information) is not contained in the advertised virtual link information, and hence there is a case of taking a route coming and going between the plural rings. In this case, a standby path must be set up in each ring, and therefore such a problem arises that extra standby resources are needed.

Figure 1:
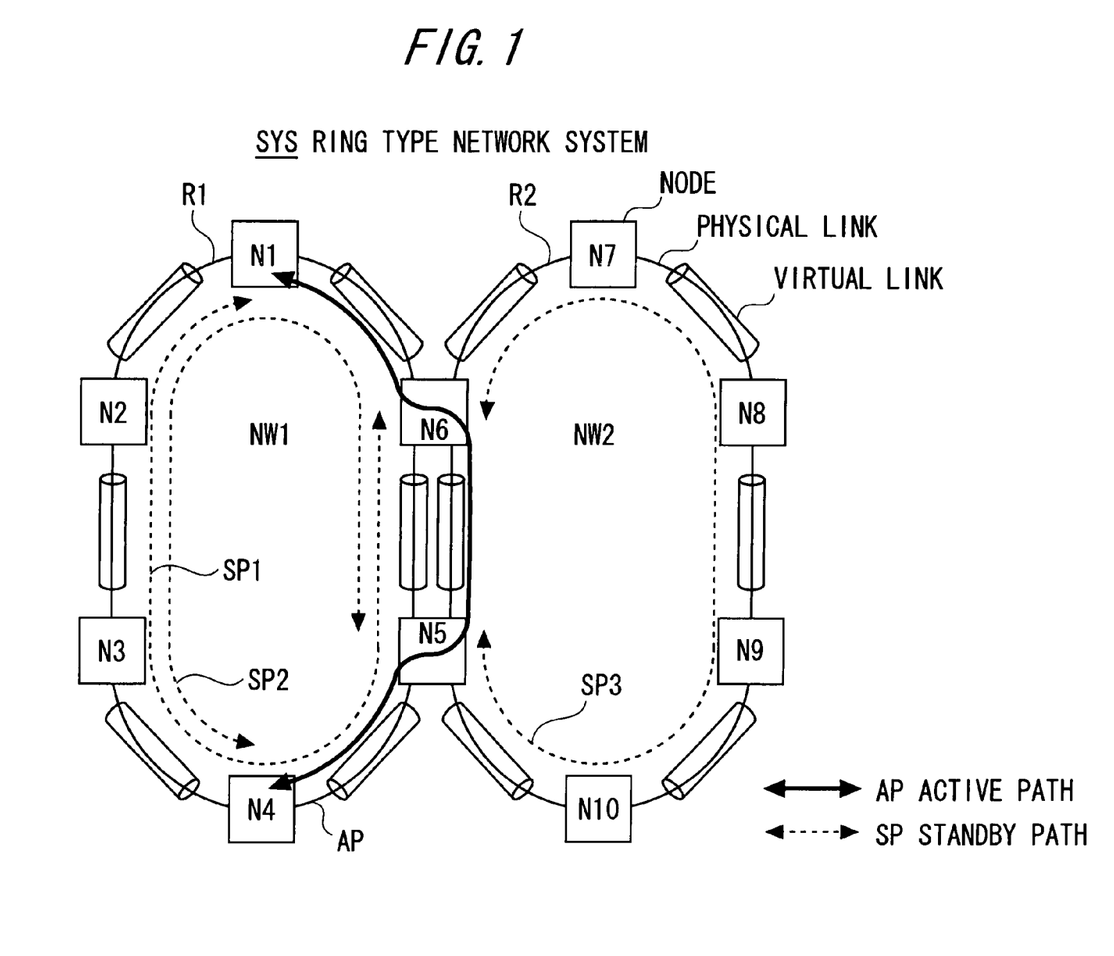
FIG. 1 is a diagram showing architecture of a conventional ring type network system.

For instance, as shown in FIG. 1, in a ring type network system SYS taking a mode wherein a plurality of physical links belonging to rings R1, R2 different from each other exists between two nodes N5, N6 opposite to each other, in the case of setting up a path (active path) AP extending from a node N1 to a node N4 configuring a first ring network NW1, a route of the path is calculated in the node N1. The topology information held by the node N1 does not contain ring information, and hence it is impossible to determine which link in the plurality of virtual links (TE links) between the node N6 and the node N5 is preferable for selection. Accordingly, there is a case of taking the route coming and going between the plural rings R1, R2.

In the case of UPSR (Unidirectional Path Switched Ring) ring as a first ring protection technology shown in FIG. 1, standby paths SP1, SP2, SP3 are set up in an opposite direction along a section extending from a point where a signal enters to a point where the signal exits, so that the extra standby resources are required in the case of the route coming and going between the rings R1, R2.

Further, in the case of BLSR (Bidirectional Line Switched Ring) ring as a second ring protection technology, on the route coming and going between the rings R1, R2, if a fault occurs in the node N5 or the node N6, resulting in a problem where the ring can not be restored.

The following is a related art to the present invention.
[Patent document 1] Japanese Patent Laid-Open Publication No. 6-237262

SUMMARY OF THE INVENTION

It is an object of the present invention to provide a technology of setting up a path (active path) capable of restraining use of standby resources for ring protection.

In order to solve the problems, according to the present invention, a node for configuring a ring type network system in such a mode that a plurality of physical links belonging to difference rings exists between two nodes opposite to each other, comprising: a storage unit stored with link associated information representing an associated relationship between ports of physical links and a port of a virtual link virtually set up to at least one physical link, ring configuration information representing a paired relationship of the ports of the physical links configuring the different ring, physical link information associated with port numbers of both ends of the physical link and virtual link information associated with port numbers of both ends of the virtual link; and a processing unit executing a process of transmitting, to other nodes, such information that one virtual link is associated with the plurality of physical links belonging to the different ring, and setting up, when receiving a signaling message for setting up a path, the path passing through the same ring on the basis of path route information in the message and the storage information stored in the storage unit.

In this configuration, the processing unit, if a self node corresponds to an originating node of the path, stores an output port number of the selected physical link and an output port number of the virtual link on a route extending to a terminating node as the path route information in the signaling message, and transmits the path route information to a next node.

Further, the processing unit, if the self node corresponds to a relay node of the path, judges the selected physical links on the basis of the path route information in the received signaling message and the physical link information, and selects the physical links extending through the same ring as the input physical link extends through on the basis of the ring configuration information.

Still further, the processing unit adds the output port number of the selected physical link to the path route information in the signaling message.

Yet further, the processing unit judges based on terminating node information in the signaling message that the self node is the terminating node, and finishes a path setup process.

According to the present invention, the paths (active paths) passing through the same ring can be set up to the greatest possible degree, and it is therefore possible to restrain the use of the standby resource for the ring protection.

Other objects, features and advantages of the present invention will become apparent by reading the specification (an embodiment) that will hereinafter be described when taken in conjunction with the drawings and scope of claims appended.

DETAILED DESCRIPTION OF THE PREFERRED EMBODIMENTS

The present invention will hereinafter be described in greater detail with reference to the accompanying drawings. The drawings illustrate a preferred embodiment of the present invention. The present invention can be, however, carried out in many different modes and should not be construed to be limited to the embodiment described in the specification. More essentially, the embodiment is provided so that the disclosure of the specification becomes thorough and perfect, and so that the scope of the invention is sufficiently conveyed to those skilled in the art.

[System Architecture]

Figure 2:
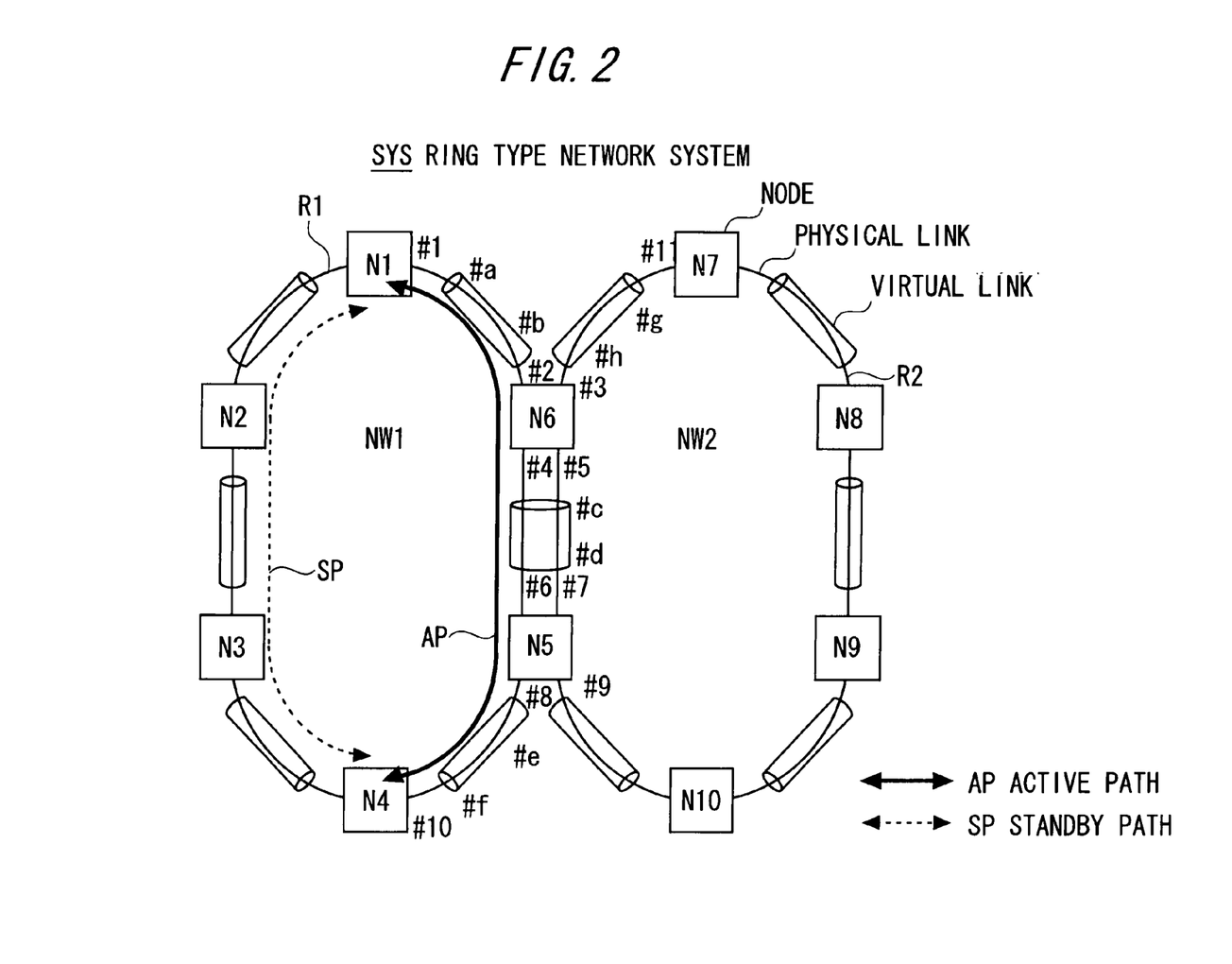
FIG. 2 is a diagram showing architecture of a ring type network system in one embodiment of the present invention.

Referring to FIG. 2 showing a system architecture in one embodiment of the present invention, this ring type (ring topology) network system SYS is a SONET/SDH (Synchronous Optical Network/Synchronous Digital Hierarchy) in a mode wherein a plurality of physical links belonging to a first ring R1 and a second ring R2 different from each other exists between two nodes N5, N6 opposite to each other, and has a function of setting up a path (active path) that is capable of restraining use of standby resources for ring protection.

This ring type network system SYS includes a first ring network NW1 and a second ring network NW2. The first ring network NW1 is configured by a plurality of nodes (node devices) N1-N6 and the first ring R1 that connects these nodes N1-N6 in an annular shape (ring). The second ring network NW2 is configured by a plurality of nodes N5-N10 and the second ring R2 that connects these nodes N5-N10 in the annular shape (ring). Each of the first ring R1 and the second ring R2 has physical links and virtual links (TE (Traffic Engineering) links) logically set up to these physical links.

This ring type network system SYS adopts a method of organizing topology information by advertising virtual link information in a way that utilizes a routing protocol OSPF-TE (Open Shortest Path First-Traffic Engineering) (defined in RFC3630), and setting up a path on the basis of a result of calculating a route of the path in a way that utilizes a signaling protocol RSVP-THE (Resource Reservation Protocol-Traffic Engineering) (defined in RFC3209, RFC3473) etc.

A route calculation unit for the nodes N1-N10, if a plurality of physical links belonging to a difference ring exists between the two nodes opposite to each other, logically associates these physical links with one virtual link, and advertises the link information thereof to other nodes. The route calculation unit in an originating node of the path calculates the route on the basis of the virtual link information.

[Node Configuration]

Figure 3:
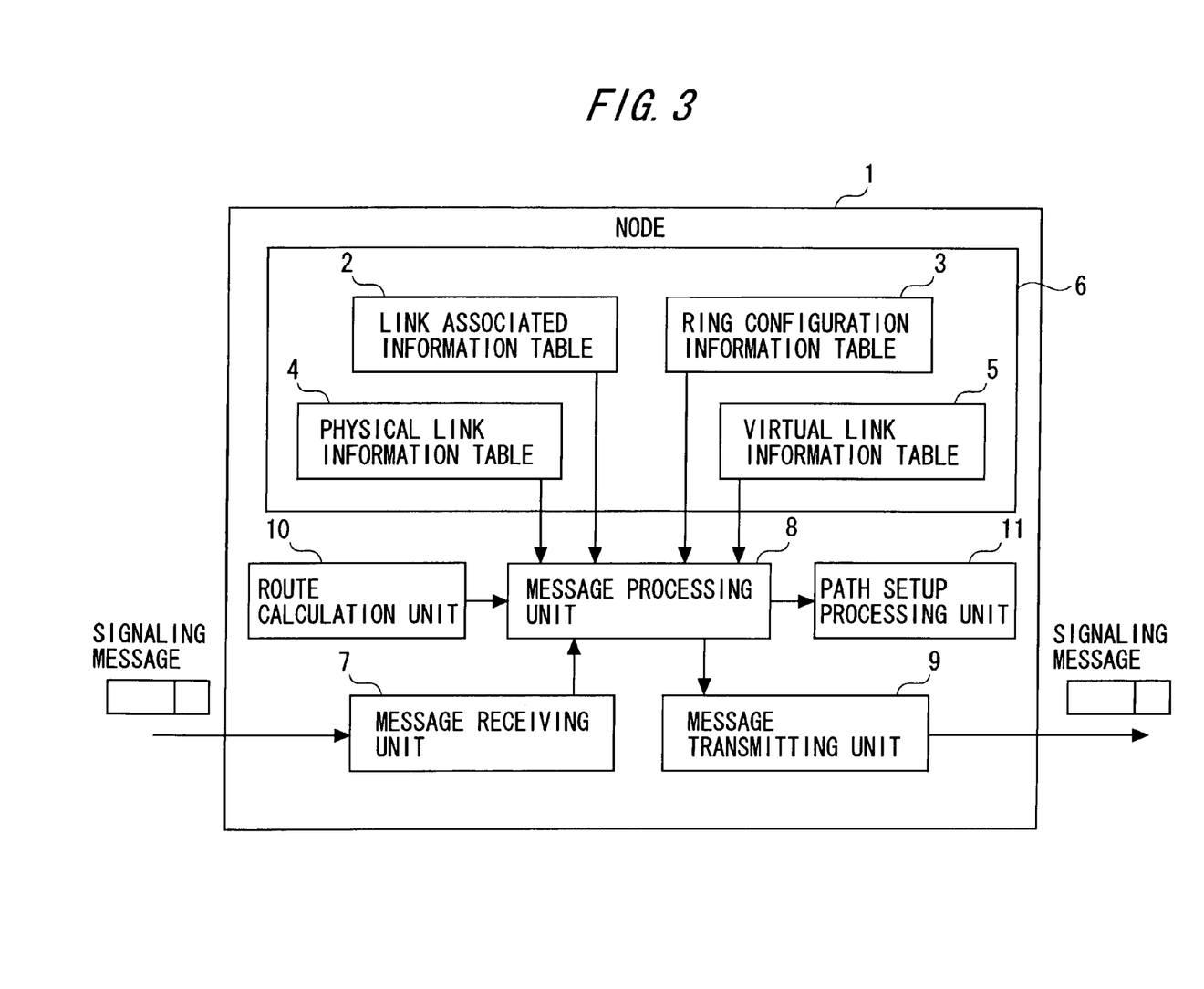
FIG. 3 is a block diagram showing a detailed configuration of a node in FIG. 2.

Each of the nodes N1-N10 configuring the ring type network system SYS shown in FIG. 2 takes a configuration illustrated in FIG. 3.

The node 1 includes an information storage unit 6 containing a link associated information table 2, a ring configuration information table 3, a physical link information table 4 and a virtual link information table 5. Further, the node 1 includes a message receiving unit 7, a message processing unit 8, a message transmitting unit 9, a route calculation unit 10 and a path setup processing unit 11.

In the node 1, the link associated information table 2 retains (is stored with) link associated information showing an associated relationship between ports (an input port number and an output port number) of the virtual link and ports (an input port number and an output port number) of the physical link. The ring configuration information table 3 retains ring configuration information showing a paired relationship between the input physical port and the output physical port configuring the first ring R1 and/or the second ring R2. The physical link information table 4 retains port number information of both ends of the physical link. The virtual link information table 5 retains port number information of both ends of the virtual link.

In the node 1, the message receiving unit 7 receives a signaling message (path setup message) from an uplink node etc, and transfers this message to the message processing unit 8. The message processing unit 8 selects a proper physical link on the basis of the signaling message sent from the message receiving unit 7, the link associated information, the ring configuration information, the physical link information and the virtual link information, and generates and transfers a new signaling message to the message transmitting unit 9.

Further, the message transmitting unit 9 transmits the signaling message given from the message processing unit 8 to a downlink node. The route calculation unit 10 calculates a route ranging from the originating node to the terminating node, then transfers a calculation result to the message processing unit 8, and at the same time advertises the virtual link information. The path setup processing unit 11 executes a process for setting up the path.

[Structures of Variety of Tables]

Figure 4:
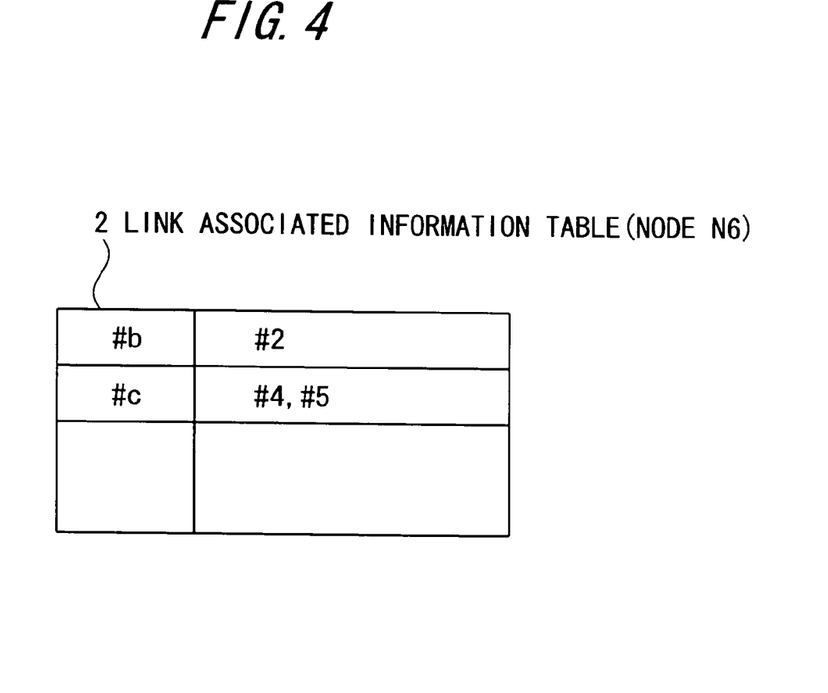
FIG. 4 is a diagram showing an example of a structure of a link associated information table.

FIG. 4 shows the link associated information table 2 in the node N6, and illustrates the link associated information representing the associated relationship between the port of the virtual link and the port(s) of the physical link(s), wherein, for instance, a port #c of the virtual link is associated with ports #4 and #5 of the physical links.

Figure 5:
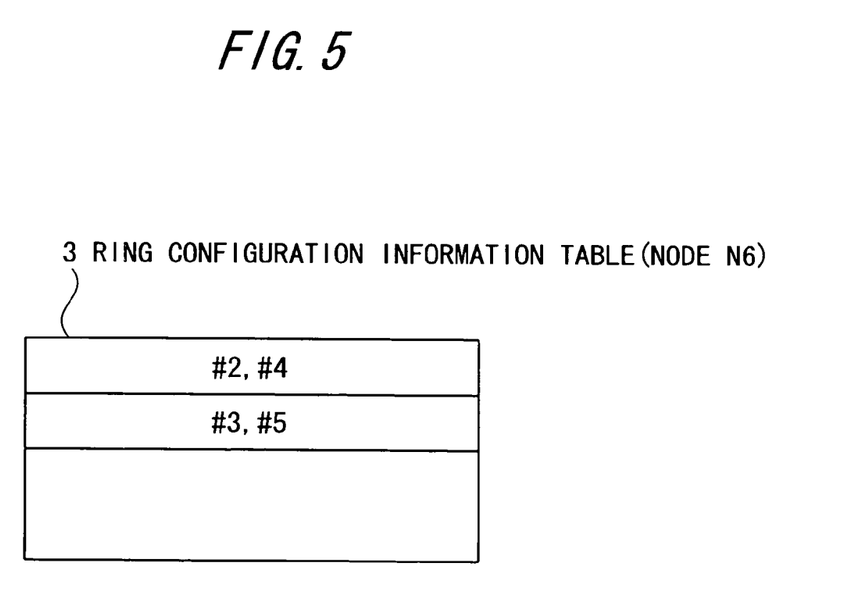
FIG. 5 is a diagram showing an example of a structure of a ring configuration information table.

FIG. 5 is the ring configuration information table 3 in the node N6, and shows the ring configuration information representing the paired relationship of the ports of the physical links configuring the ring, wherein, for example, a physical port #2 and a physical port #4 belong to the same ring (the first ring R1).

Figure 6:
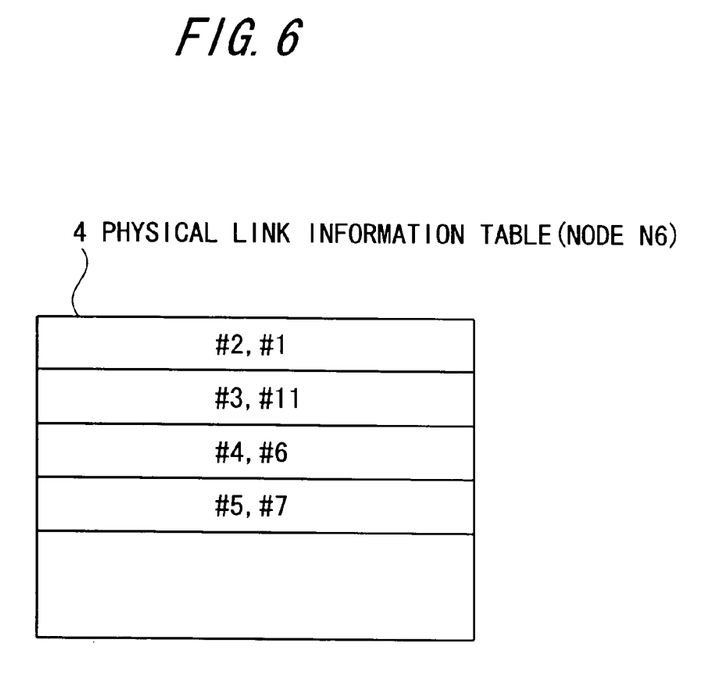
FIG. 6 is a diagram showing an example of a structure of a physical link information table.

FIG. 6 shows the physical link information table 4 in the node N6, and illustrates the physical link information representing the port numbers of both ends of the physical link, wherein, for example, a port opposite to the port #2 is a port #1.

Figure 7:
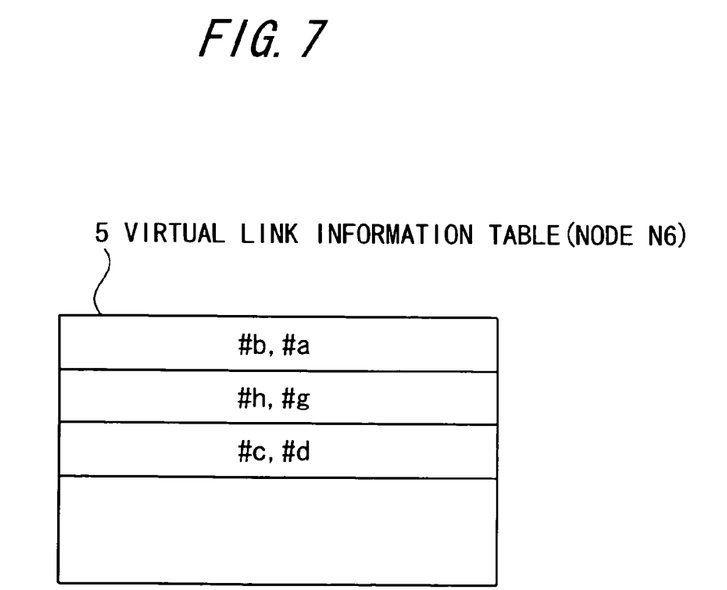
FIG. 7 is a diagram showing an example of a structure of a virtual link information table.

FIG. 7 shows the virtual link information table 5 in the node N6, and illustrates the virtual link information representing the port numbers of both ends of the virtual link, wherein, for instance, a port opposite to the port #b is a port #a.

Operational Example

Figure 8:
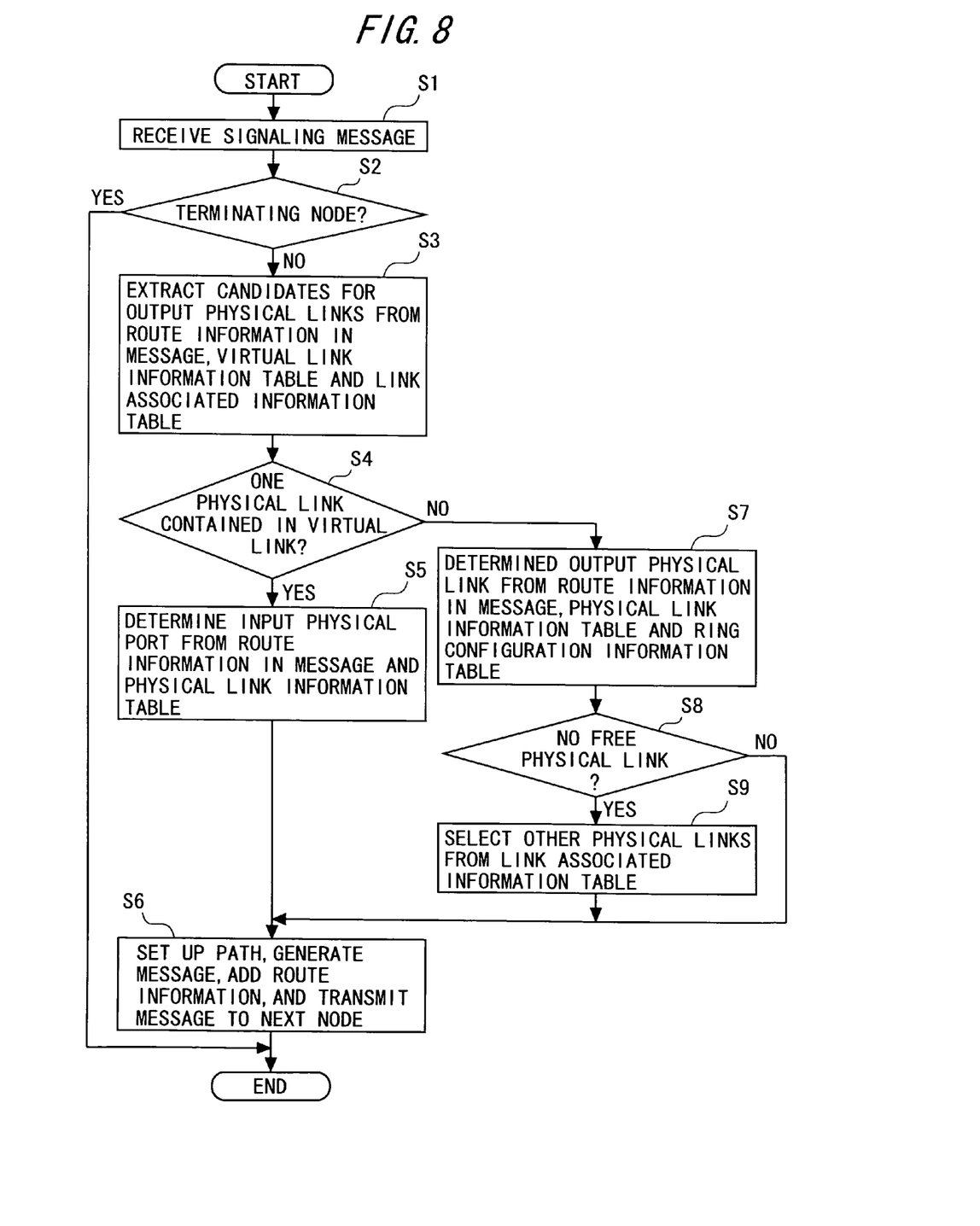
FIG. 8 is an explanatory flowchart showing an operation in the ring type network system in one embodiment of the present invention.

Next, an operational example in the ring type network system SYS in one embodiment of the present invention will be explained with reference to FIGS. 2 through 8 in combination. FIG. 8 is a flowchart showing a processing procedure (S1-S9) in each node.

Exemplified herein is, in the ring type network system SYS illustrated in FIG. 2, a case of setting up a path (Active Path) AP extending from the node (originating node) N1 to the node (terminating node) N4 that belong to the first ring network NW1 on the first ring R1.

To start with, in the node N1, the route calculation unit 10 calculates the route of the setup target path and transfers the route information (path route information) to the message processing unit 8.

The message processing unit 8 sets (stores), in the signaling message (path setup message), the port number (output port numbers) #b, #d, #f of the virtual links on the route, the port number (output port number) #1 of the physical link selected in response to a request given from outside and terminating node information N4 as items of route information. The signaling message containing the setting of these items of route information is transmitted from the message transmitting unit 9 to the node N6 positioned as the next node (downlink node).

In the node (relay node) N6, the message receiving unit 7 receives the signaling message from the node N1, and the message processing unit 8 recognizes based on the route information contained in this message that the next port is the port #d and recognizes from the virtual link information table 5 that the input port associated with the port #d is the port #c. Further, the message processing unit 8 recognizes based on the link associated information table 2 that the ports #4, #5 of the physical links are included in the port #c of the virtual link.

Next, the message processing unit 8 searches the physical link information table 4 for a port number associated with the port number #1 of the selected physical link in the route information in the signaling message, and determines this port number as the port number #2. Further, the message processing unit 8 searches the ring configuration information table 3 for the port #4 associated with the port #2. The port #4 is included in the port #2, and hence the port #4 is determined to be the output physical port.

The path setup processing unit 11 of the node N6 sets up the path between the port #2 and the port #4. Then, the message processing unit 8 stores, in the signaling message, the ports of the selected physical links as the ports #1, #4, and the message transmitting unit 9 transmits the message to the node N5 positioned as the next node (downlink node).

It is to be noted that in the node N6, the message processing unit 8, if the port #4 of the physical link lacks in a free capacity, selects the port #5 of the second ring R2 because of recognizing based on the link associated information table 2 that the ports #4, #5 are included in the port #c of the virtual link.

In the node (relay node) N5, after the message receiving unit 7 has received the signaling message from the node N6, the message processing unit 8 recognizes from the route information in the signaling message that the next port is the port #f, and recognizes from the virtual link information table 5 that the port opposite to the port #f is the port #e. Further, the message processing unit 8 recognizes from the link associated information table 2 that the port #8 is included in the port #e. In this case, the port included in the port # is only one, and therefore the port #8 is determined to be the output physical port.

Moreover, the message processing unit 8 searches the physical link information table 4 for the port number associated with the port number #4 of the selected physical link in the route information in the signaling message, thereby determining the port number #6. The path setup processing unit 11 sets up the path between the port #6 and the port #8. Then, the message processing unit 8 stores, in the signaling message, the port numbers of the selected physical links as the ports #1, #4, #8, and the message transmitting unit 9 transmits the message to the next node N4.

In the node (terminating node) N4, the message receiving unit 7 receives the signaling message from the node N5, and the message processing unit 8 judges from the terminating node information N4 in the signaling message that the self node is the terminating node, and finishes the path setup process.

A standby path SP in the UPSR ring exemplified in FIG. 2 is set up by a method such as setting up the path SP from, e.g., a network management system and setting up the path SP through the signaling message from the node N1 serving as the originating node of the standby path SP.

Modified Example

The processes in one embodiment discussed above are provided as a program executable by a computer and can be provided through storage medium such as a CD-ROM and a flexible disc and further via a communication line. Further, the respective processes in one embodiment discussed above can be also carried out in a way that selects and combines an arbitrary plural number of processes or all the processes.

The disclosure of Japanese Patent Application No. JP2006-074589 filed on Mar. 17, 2006 including the specification, claims, drawings and abstract is incorporated herein by reference in its entirety.

What is claimed is:

1. A ring type network system including a function of setting up a path, comprising:

a first ring network configured by a plurality of first nodes and a first ring, the first ring connecting the first nodes in an annular shape, the first ring including physical links that directly connect between opposite two first nodes by a physical link, and the first ring further including virtual links being virtually set up to the physical links, respectively, in the first ring in advance based on advertised information; and a second ring network configured by a plurality of second nodes and a second ring, the second ring connecting the second nodes in an annular shape, the second ring including physical links that directly connect between opposite two second nodes by a physical link, and the second ring further including virtual links being virtually set up to the physical links, respectively, in the second ring in advance based on the advertised information;

wherein the first and second ring networks include shared opposite two nodes being configured by specified opposite two first nodes and specified opposite two second nodes, the shared opposite two nodes are directly connected by both the physical link in the first ring and the physical link in the second ring associated with one virtual link;

one of the shared opposite two nodes includes a processing unit and a storage unit, the storage unit storing with link associated information representing an associated relationship between port numbers of respective one ends of input and output physical links and port numbers of respective one ends of input and output virtual links, ring configuration information representing an associated relationship between the port numbers of the respective one ends of the input and output physical links configuring at least one of the first ring and the second ring, physical link information associated with port numbers of respective both ends of the input and output physical links, and virtual link information associated with port numbers of respective both ends of the input and output virtual links; and the processing unit in the one of the shared opposite two nodes receives a signaling message that is stored with a port number of other end of a selected output physical link, port numbers of respective other ends of the output virtual links on the path extending to a terminating node and information for specifying the terminating node as path route information in an originating node, recognizes the port numbers of the both ends of the one virtual link based on the path route information in the received signaling message and the virtual link information, recognizes the associated relationship between the port numbers of the respective one ends of the output physical links and the port number of the one end of the one virtual link based on the link associated information, determines the port number of the one end of the selected output physical link based on the path route information in the received signaling message and the physical link information, determines the port number of the one end of the output physical link extending through an identical ring in the first ring or the second ring based on the ring configuration information, adds the port number of the one end of the determined output physical link to the path route information in the signaling message, and transmits the signaling message to the other of the shared opposite two nodes.

2. The ring type network system according to claim 1, wherein the processing unit in the one of the shared opposite two nodes, if there is no free link in the output physical links to be selected, selects a different physical link belonging to the one virtual link based on the link associated information.

3. The ring type network system according to claim 1, wherein the storage unit is stored in a table format with the link associated information, the ring configuration information, the physical link information and the virtual link information.

4. The ring type network system according to claim 1, wherein the ring type network system is a SONET (Synchronous Optical Network)/SDH (Synchronous Digital Hierarchy) network, and uses OSPF-TE (Open Shortest Path First-Traffic Engineering) As a routing protocol and RSVP-TE (Resource Reservation Protocol-Traffic Engineering) As a signaling protocol.

5. The ring type network system according to claim 1, wherein each of the first nodes, the second nodes and the other of the shared opposite two nodes includes a processing unit and a storage unit, the storage unit storing with link associated information representing an associated relationship between port numbers of respective one ends of input and output physical links and port numbers of respective one ends of input and output virtual links, ring configuration information representing an associated relationship between the port numbers of the respective one ends of the input and output physical links configuring at least one of the first ring and the second ring, physical link information associated with port numbers of respective both ends of the input and output physical links, and virtual link information associated with port numbers of respective both ends of the input and output virtual links.

6. The ring type network system according to claim 5, wherein the processing unit in the other of the shared opposite two nodes recognizes the port numbers of the both ends of the output virtual link based on the path route information in the received signaling message and the virtual link information, recognizes the associated relationship between the port number of the one end of the output physical link and the port number of the one end of the output virtual link based on the link associated information, determines the port number of the one end of the output physical link based on the path route information in the received signaling message and the physical link information, determines the port number of the one end of the output physical link extending through the identical ring based on the ring configuration information, adds the port number of the one end of the determined output physical link to the path route information in the signaling message, and transmits the signaling message toward the terminating node.

7. The ring type network system according to claim 6, wherein the processing unit in the terminating node terminates setting up the path based on the information for specifying the terminating node in the received signaling message.

* * * * *